United States Patent [19]
Oh

[11] Patent Number: 5,307,172
[45] Date of Patent: Apr. 26, 1994

[54] METHOD AND APPARATUS FOR AUTOMATICALLY INSERTING TITLES FOR VIDEO PROGRAMS ON VIDEO TAPE

[75] Inventor: Young G. Oh, Seoul, Rep. of Korea

[73] Assignee: Gold Star Co., Ltd., Seoul, Rep. of Korea

[21] Appl. No.: 718,355

[22] Filed: Jun. 24, 1991

[51] Int. Cl.$^5$ .............................................. H04N 5/782
[52] U.S. Cl. ..................................... 358/335; 360/33.1
[58] Field of Search ...................... 358/335, 906, 191.1, 358/142, 183, 22; 360/33.1; H04N 5/782

[56] References Cited

U.S. PATENT DOCUMENTS

| | | | |
|---|---|---|---|
| 4,706,121 | 11/1987 | Young | 358/142 |
| 4,858,012 | 8/1989 | Hino et al. | 358/906 |
| 4,873,584 | 10/1989 | Hashimoto | 358/335 |
| 4,977,455 | 12/1990 | Young | 358/335 |
| 5,097,348 | 3/1992 | Suetaka | 358/335 |

FOREIGN PATENT DOCUMENTS

| | | | |
|---|---|---|---|
| 0322909 | 7/1989 | European Pat. Off. | H04N 5/782 |
| 0393955 | 10/1990 | European Pat. Off. | H04N 5/782 |

*Primary Examiner*—Jeffery Brier
*Assistant Examiner*—Huy Nguyen
*Attorney, Agent, or Firm*—Finnegan, Henderson, Farabow, Garrett & Dunner

[57] ABSTRACT

In a VCR including a timer microprocessor for counting capstan frequency signals or reel pulses from a VCR mechanism and a system control unit for communicating with the timer microprocessor and supplying predetermined signals to the VCR mechanism and a servo system, a method for executing predetermined assembly programs adapted to assembly edit several recorded programs according to the order desired and inserting titles in respective recorded programs. In order to carry out title inserting for respective recorded programs during execution of predetermined assembly programs, a memory is provided which is adapted to store data corresponding to the assembly programs and titles of recorded programs, in accordance with the control of timer microprocessor. In accordance with the method and apparatus, titles can be automatically and conveniently inserted in respective recorded programs during the execution of predetermined assembly programs, thereby avoiding any poor screen quality caused by repeated playback and recording of programs.

8 Claims, 8 Drawing Sheets

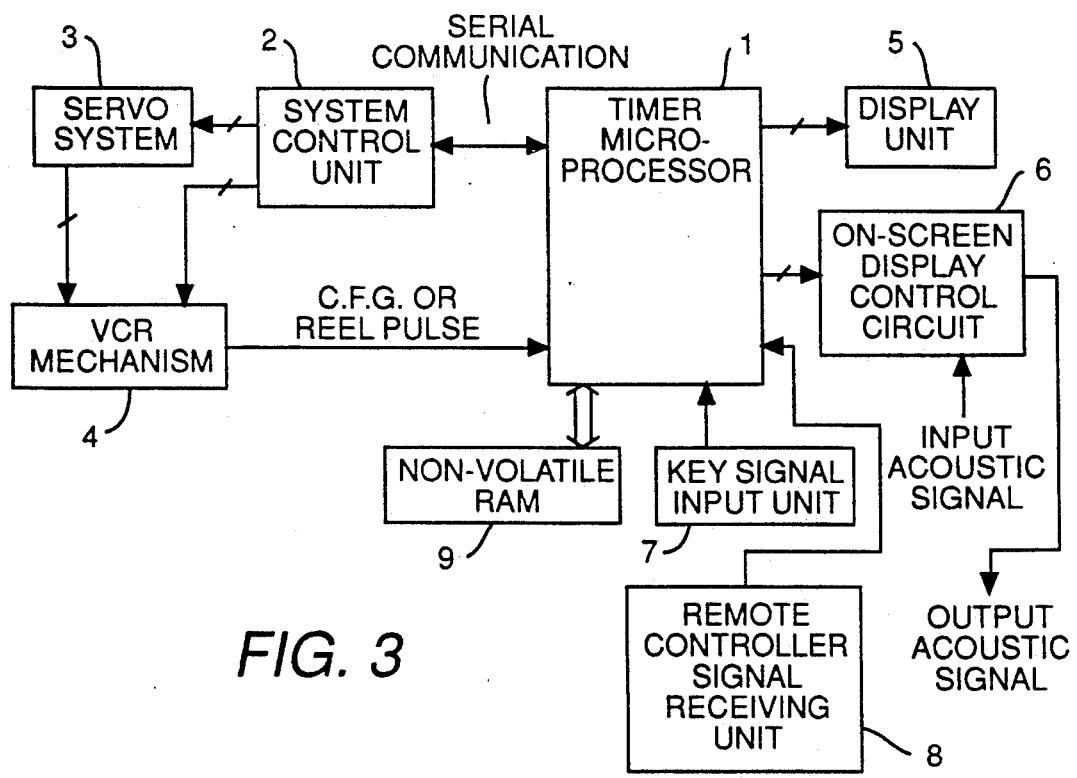

(FIRST TITLE MENU)

(SECOND TITLE MENU)

(THIRD TITLE MENU)

(FOURTH PROCEDURE)

(FIRST PROCEDURE)

(SECOND PROCEDURE)

(THIRD PROCEDURE)

METHOD AND APPARATUS FOR AUTOMATICALLY INSERTING TITLES FOR VIDEO PROGRAMS ON VIDEO TAPE

BACKGROUND OF THE INVENTION

1. Field of the Invention

The present invention relates to method and apparatus for automatically inserting program titles in VCR, and more particularly to method and apparatus for automatically inserting program titles in predetermined positions between title start and end points of assembly-edited recorded contents in VCR.

2. Description of Prior Art

FIG. 1, show a conventional VCR with a function of assembly editing recorded contents. The VCR comprises a timer microprocessor 1 for counting output signals from a capstan frequency signal generator or a reel pulse generator (not shown) which constitutes a part of VCR mechanism 4 for carrying out inserting, ejecting, loading and unloading operations for a VCR tape; a system control unit 2 adapted for continuously communicating with said timer microprocessor and generating control signals so that the VCR can accomplish normal functions (Play, Fast Forward, Rewind and Reverse modes); and a servo system 3 for controlling the speed and phase of VCR mechanism 4 according to the control of said system control unit 2 so that the VCR mechanism 4 can carry out inserting, ejecting, loading and unloading operations for VCR tape, in accordance with the control of said servo system 3. The VCR also comprises a display unit 5 for displaying function conditions of VCR and time; an on-screen display control circuit 6 for displaying characters by its overlapping on a screen played back from a VCR tape according to the control of timer microprocessor 1 or a TV screen displayed through a tuner; a key signal input unit 7 for supplying various key signals for assembly editing recorded programs and automatically inserting titles into respective recorded programs; and a remote controller signal receiving unit 8 for receiving various signals outputted from a remote controller (not shown) to perform required functions and for transmitting them to the timer microprocessor 1. The assembly editing procedure for recorded programs in the above-mentioned arrangement will now be described in conjunction with FIG. 2.

First, when respective recorded programs which have been recorded according to the order of A, D, C, B and E are desired to be edited according to the order of A', B', C', D', and E', they are played back according to the original recording order while start point and end point of each recorded program is reset in the order desired, according to the assembly program. Thereafter, the programs are recorded again.

At this time, the start and end points of each recorded program is determined by using counted values of the timer microprocessor 1 counting output signals from a real time counter or reel pulse counter which outputs respective time signals converted from frequency signals generated by a capstan. If a title should be inserted into the screen of each program, under the condition that the assembly editing of recorded programs is executed according to the order desired, as above-mentioned, the title inserting position is accurately preset on the screen of each recorded program by using a jog or shuttle disposed at external while the programs are played back. Then, the title making routine of the on-screen display main routine is executed to make the title of each recorded program. The formed title is inserted in the preset title inserting position, and then the recording of program is executed.

Thereafter, respective recorded contents in which titles have been inserted are played back according to the order of A'', B'', C'', D'', and E''.

The above-mentioned prior art requires one recording process for assembly editing recorded programs according to the order desired, which programs were originally recorded in the VCR tape according to a certain order, and another recording process for inserting respective titles in the predetermined positions of respective assembled programs. As a result, the obtained screen quality becomes poor since the title-inserted programs are obtained by the twice recordings.

Furthermore, there is an inconvenience, because for accomplishing the functions for assembly editing and title inserting of recorded programs, all steps of assembly editing recorded programs, presetting respective title inserting positions of programs, making titles and playing back respective title-inserted programs are manually and repeatedly carried out.

SUMMARY OF THE INVENTION

Therefore, an object of the present invention is to overcome the disadvantages encountered in the above-mentioned prior art and to provide a method and an apparatus for automatically inserting program titles in VCR, which utilizes a memory for title data store and predetermined assembly programs so that in assembly editing several recorded programs according to the order desired, a title of each recorded program can be automatically inserted in a predetermined position, thereby avoiding any poor screen quality caused by repeated playback and recording of programs.

In order to accomplish the above object, the present invention provides an apparatus for automatically inserting program titles in a VCR, comprising a timer microprocessor adapted for counting capstan frequency signals or reel pulses generated from a VCR mechanism equipped in said VCR and generating a control signal in response to a key signal inputted from external to execute an assembly program and insert titles in respective recorded programs, a system control unit adapted for serially communicating with said timer microprocessor and outputting a control signal to a VCR servo system and said VCR mechanism, an on-screen display control circuit adapted for inserting respective required titles in predetermined screens of recorded programs according to said control signal from the timer microprocessor, and a display unit adapted for displaying function conditions of VCR and time in accordance with the control signal from the timer microprocessor. The apparatus further comprises: a memory adapted storing, by the control of microprocessor, data corresponding to said key signal inputted from external to the timer microprocessor for executing assembly programs and insert titles in respective recorded programs, whereby the timer microprocessor and the system control unit can assembly edit several recorded programs in the order desired, according to said data stored in said memory and output predetermined control signals so as to insert respective titles in predetermined position of required screens of respective recorded programs.

The present invention also provides a method for automatically inserting titles in recorded programs in a VCR which includes a timer microprocessor continuously counting capstan frequency signals or reel pulses generated from a VCR mechanism and a system control unit serially communicating with said timer microprocessor and outputting a predetermined control signal to a VCR servo system and said VCR mechanism, the method comprising: a first step of playing back several recorded programs of a VCR tape according to the original recording order, detecting start and end points of respective recorded programs by using counted values from the timer microprocessor and according to key signals inputted from external, during the playback, predetermining title inserting positions of respective recorded programs and then storing the predetermined title inserting positions in a predetermined memory; a second step of forming respective titles of recorded contents by executing a title forming routine of on-screen display main routine according to the inputted key signal and storing the written titles in a predetermined memory; and a third step of assembling the recorded programs in the order desired, by respectively using said stored start and end points of recorded programs and according to a predetermined assembly program, and simultaneously inserting respective titles for recorded programs in said predetermined positions of respective recorded programs.

BRIEF DESCRIPTION OF THE DRAWINGS

FIG. 3 is a block diagram showing a VCR control circuit according to the present invention;

FIGS. 4A to 4C are views explaining the inner format of a nonvolatile RAM according to the present invention;

DETAILED DESCRIPTION OF THE PREFERRED EMBODIMENTS

Figure 1:
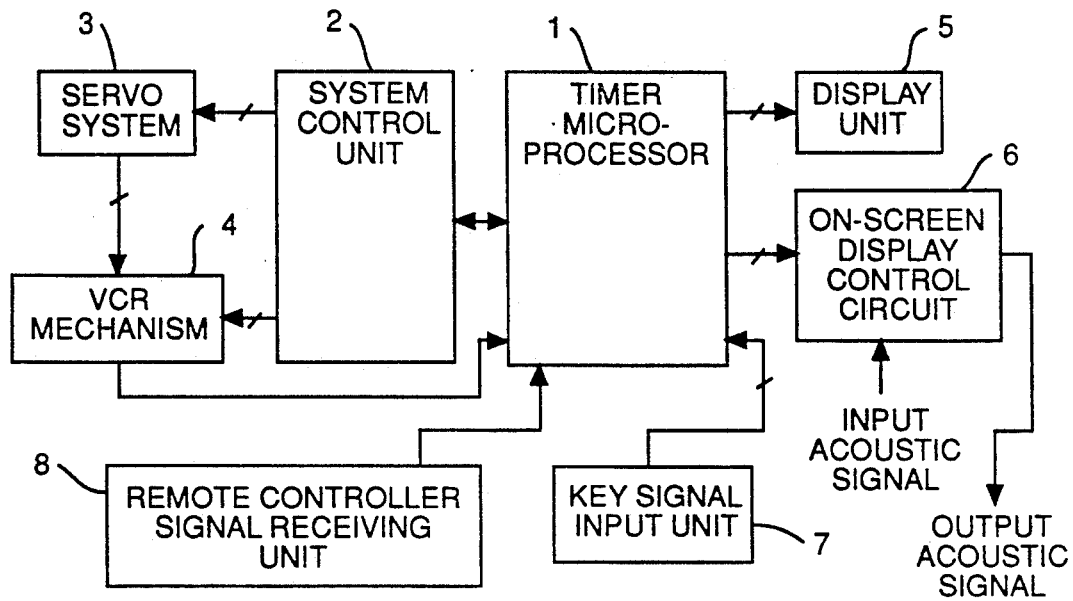
FIG. 1 is a block diagram showing a VCR control circuit according to the prior art.
Figure 2:
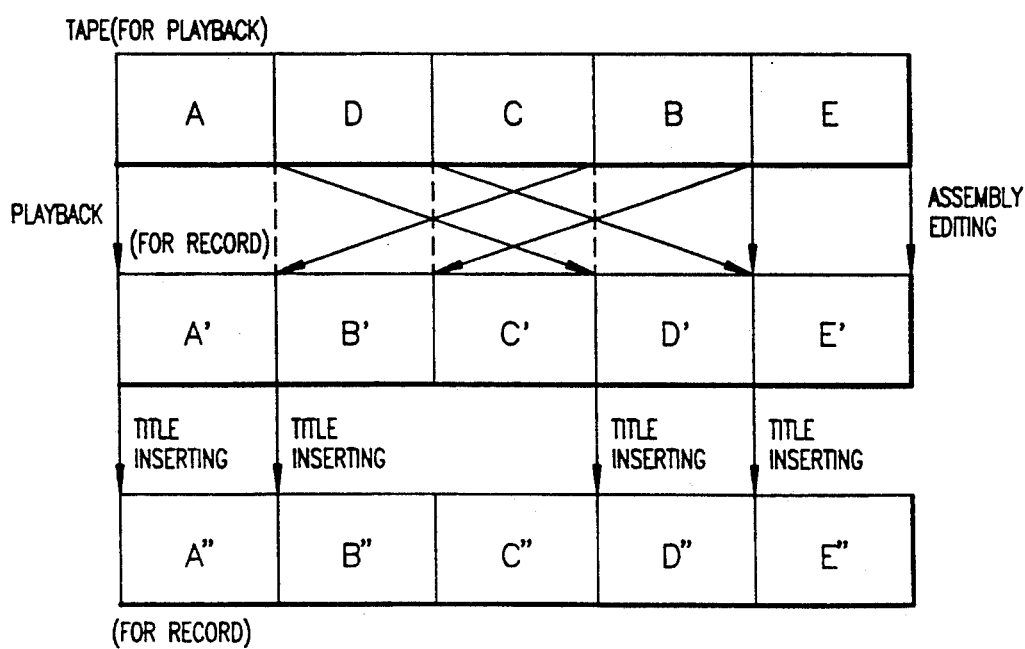
FIG. 2 is a view explaining a conventional method for inserting titles in a VCR.

The present invention will now be explained in conjunction with an embodiment shown in FIGS. 3 to 7.

FIG. 3, shows a block diagram of an apparatus for automatically inserting titles in recorded video programs for a VCR, in accordance with the present invention. The apparatus comprises a timer microprocessor 1 which counts values corresponding to time by utilizing capstan frequency signals or reel pulses generated from a VCR mechanism equipped in the VCR. The timer microprocessor 1 generates a control signal in response to a key signal inputted from external to execute an assembly program and automatically insert titles in predetermined positions of respective recorded programs. The apparatus also comprises a system control unit 2 which communicates continuously with the timer microprocessor 1 and the outputs a control signal to a VCR servo system and the VCR mechanism. A servo system 3 controls the speed and phase of VCR mechanism, according to the control of the system control unit 2. The VCR mechanism which is designated by reference numeral "4" can carry out inserting, ejecting, loading and unloading operations for a VCR tape, in accordance with the control of the servo system 3. The apparatus also comprises a display unit 5 for displaying function conditions of VCR and time, an on-screen display control circuit 6 for overlapping and displaying characters on a screen played back from a VCR tape according to the control of timer microprocessor 1, a key signal input unit 7 for supplying various key signals for assembly editing recorded programs and inserting titles into respective recorded programs, a remote controller signal receiving unit 8 for receiving various signals outputted from a remote controller (not shown) and for transmitting them to the timer microprocessor 1, and a non-volatile RAM 9 connected to the timer microprocessor 1 and adapted to store and output title data according to the control of the timer microprocessor 1.

The apparatus with the above arrangement of the present invention is distinguished from the prior art, in that the non-volatile RAM 9 for storing title data is additionally provided.

FIGS. 4A to 4C show the inner map format of the non-volatile RAM 9. FIG. 4A, shows a format of a part of the inner map of non-volatile RAM 9 for storing data adapted to execute the assembly program. The format includes portions P(Y, start) and P(Y, stop) for storing counted values of predetermined bits, for example, 3 bytes, (counted values from the timer microprocessor) corresponding to respective start and end points of recorded programs (in this case, 8 programs) and a portion P(Y, LIE) for storing 1 bit flags indicative of the setting of respective assembly programs for recorded programs.

FIG. 4B, shows a map format of another part of the inner map of non-volatile RAM 9 for storing respective title data. The format includes a portion T(X, 0) for storing assembly program numbers of 4 bits for respective recorded programs, a portion T(X, 1) for storing counted values of 3 bytes supplied from the timer microprocessor 1 and corresponding to start and end points of the screens of respective recorded programs in which titles are inserted, respectively, a portion T(X, 2) for storing flags of 1 bit indicative of the setting of respective title inserting positions for several recorded programs during the execution of assembly program for assembly editing the recorded programs according to the order desired, a portion T(X, 3) for storing flags of 1 bit indicative of the setting of titles executed according to the title setting function of on-screen display menu routine, a portion T(X, 4) for storing the title displaying time of 4 bits, and a portion T(X, 5) for storing 2 byte leading data of each title data stored in the address memory location of non-volatile RAM 9.

In this case, the non-volatile RAM 9 according to the present invention has the format enabling the insertion of 40 titles, and thus the value of X can be 0 to 39. On the other hand, the value of Y is 0 to 7, because the number of recorded programs is 8.

FIG. 4C shows address compartments of the non-volatile RAM 9 corresponding to respective title data, in accordance with the present invention. Each address compartment which stores each corresponding title data includes 288 addresses. Last 8; addresses of 288 addresses are adapted to divide adjacent two title data.

The number of address compartments is determined by the number of screens for displaying respective titles. In the present embodiment, 40 address compartments are provided and a RAM of 15K; bytes capacity is used for the non-volatile RAM 9.

Figure 5:
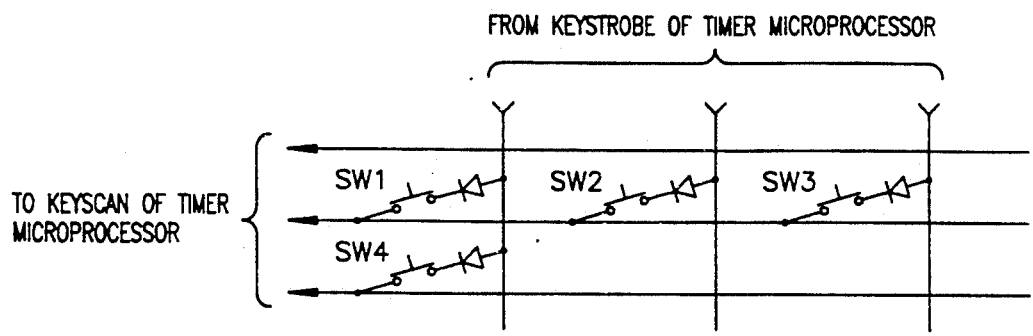
FIG. 5 is a circuit diagram of a key unit according to the present invention.

FIG. 5, shows a detailed circuit of the key unit 7 which constitutes a part of the arrangement shown in the block diagram of FIG. 3 and provides key signals for executing assembly programs and automatically inserting titles, to the timer microprocessor 1. The key unit 7 includes an assembly program set/normal select key SW1, an assembly program enter key SW2, an automatic title insert key SW3, and an assembly program start key SW4.

In this case, it is noted that the automatic title insert key SW3 is additionally provided for executing assembly programs and automatically inserting titles at the same time, as distinguished from the prior art.

Upon pressing the automatic title insert key SW3 in the setting of assembly program for arranging several recorded programs according to the order desired, the timer microprocessor 1 shown in FIG. 3 stores the counted values (that is, capstan frequency signals or reel pulses) in the non-volatile RAM 9 so as to set the screen areas of respective recorded programs in which titles are inserted, respectively. Also, indexes are provided in the screens of respective recorded programs in which titles are inserted, so that title editing can be carried out in executing the title function routine of on-screen display routine.

Figure 6:
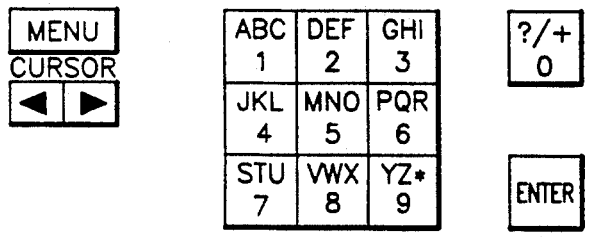
FIG. 6 is a view showing the arrangement of keys on the outer panel of a remote controller according to the present invention.

FIG. 6 shows keys provided on the outer panel of remote controller outputting predetermined signals so as to output signals for automatically inserting titles.

Figure 7A:
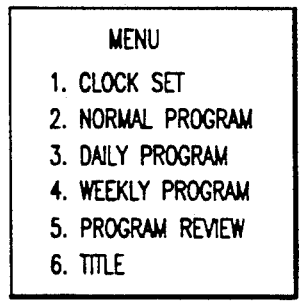
FIGS. 7A to 7D show screens produced with respect to the title forming in on-screen display routine.
Figure 7B:
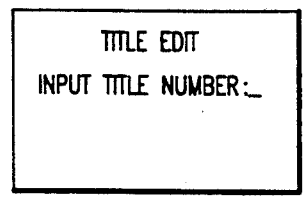
Figure 7C:
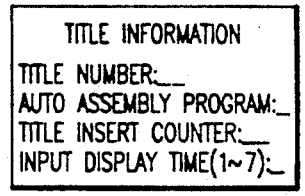
Figure 7D:
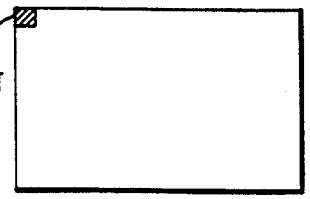

FIGS. 7A to 7D show screens displayed by executing the on-screen display routine in a well-known manner. FIG. 7A, shows a main menu for the on-screen display. If No. 6, TITLE function is selected and the first title screen as shown in FIG. 7B is displayed. When a desired title number is inputted in the first title screen of FIG. 7B, the second title screen is displayed which is adapted for obtaining information about the title corresponding to the inputted title number, once shown in FIG. 7C. As the assembly program number informing of the recorded program in which title is inserted, counted value (reel pulse or capstan frequency) corresponding to the predetermined position of screen in which title is inserted and title display time are inputted and, a third title screen is produced in which an initial cursor for the title editing is displayed, as shown in FIG. 7D.

Upon pressing the ENTER key shown in FIG. 6 after the completion of title editing, the process of title editing is completed.

As apparent from the above description, a remote controller including numeral keys, character keys is needed, cursor arrow keys and MENU key.

Figure 9:
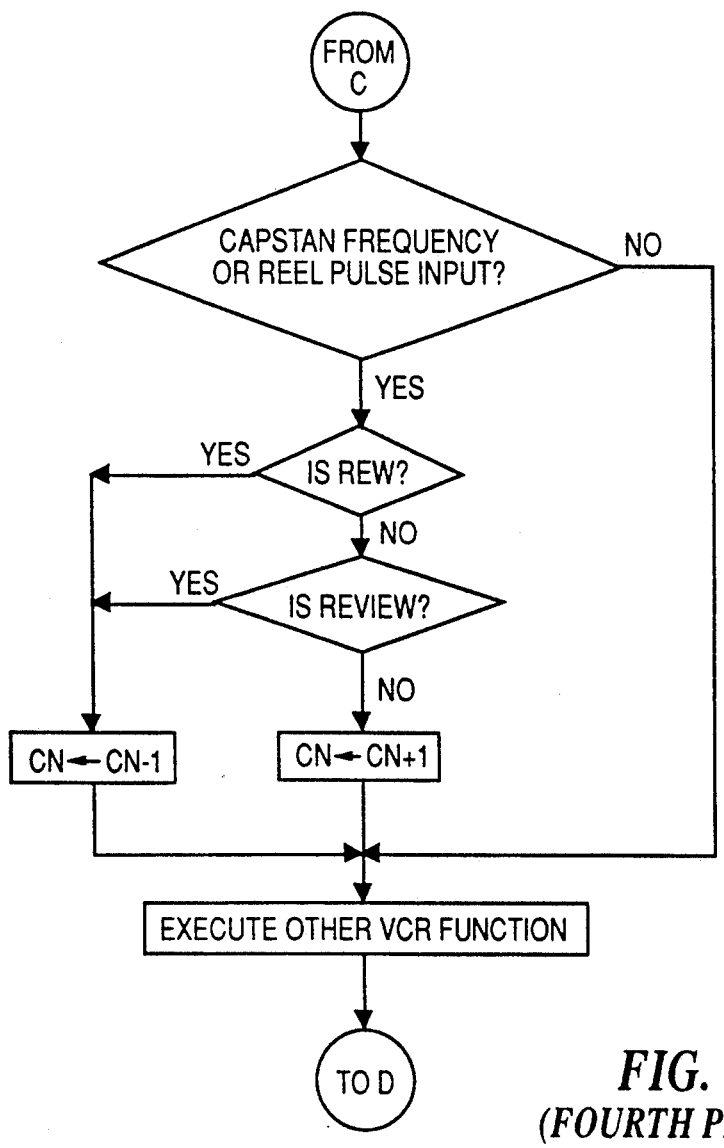
FIGS. 9A to 9D are flowcharts showing overall steps of the method for automatically inserting titles in a VCR, in accordance with the present invention.
Figure 9:
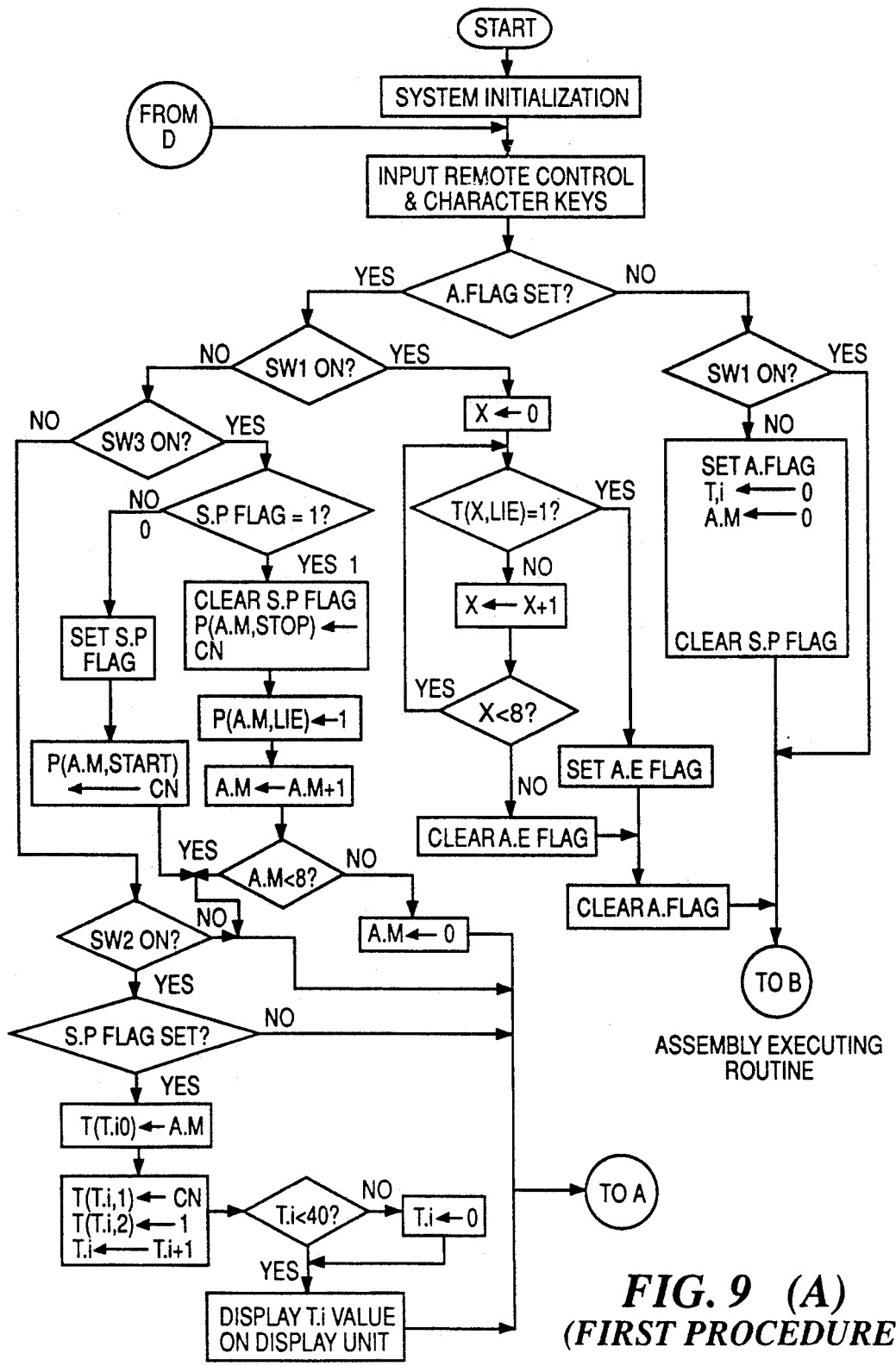
Figure 9:
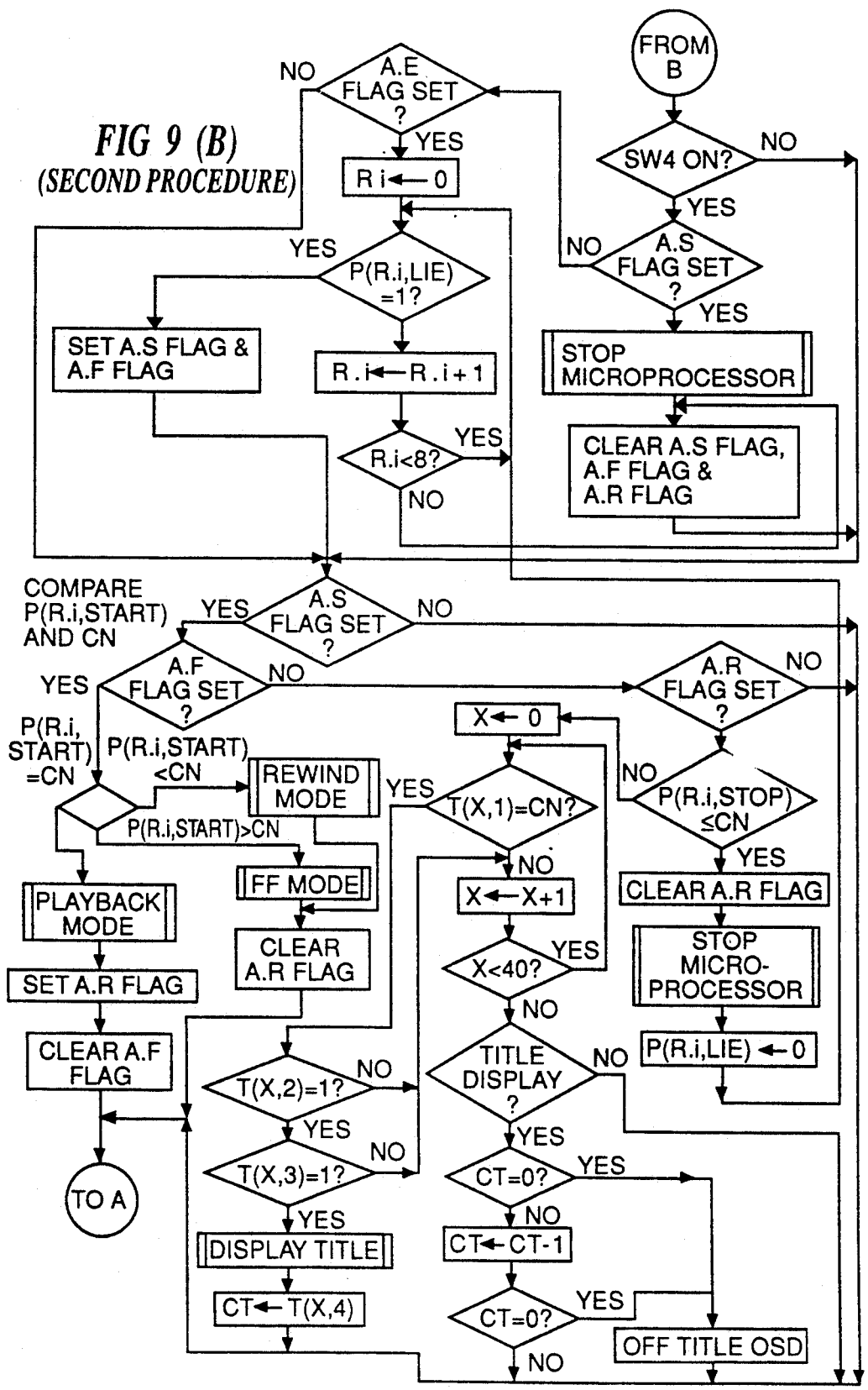
Figure 9:
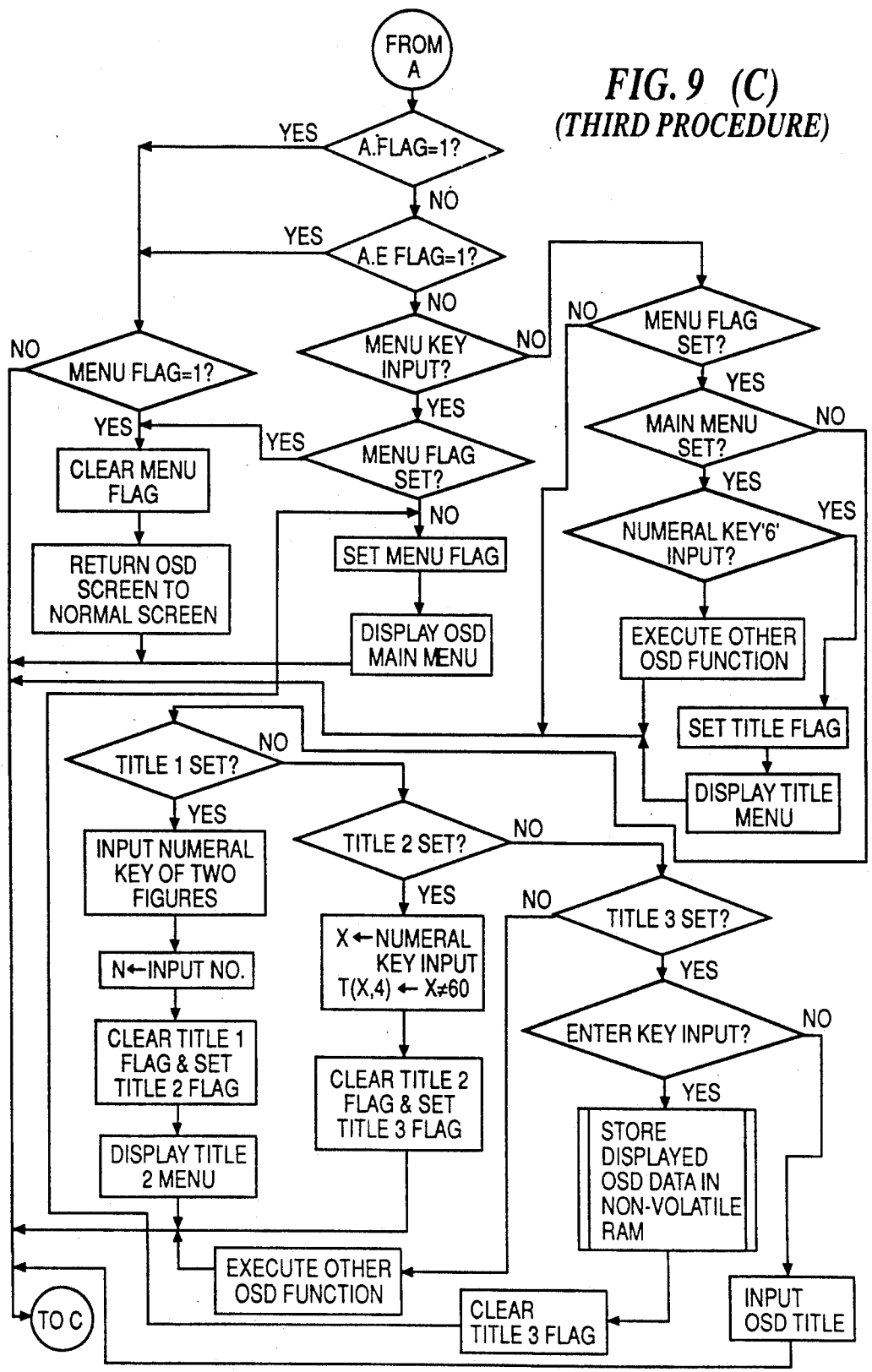
Figure 10:
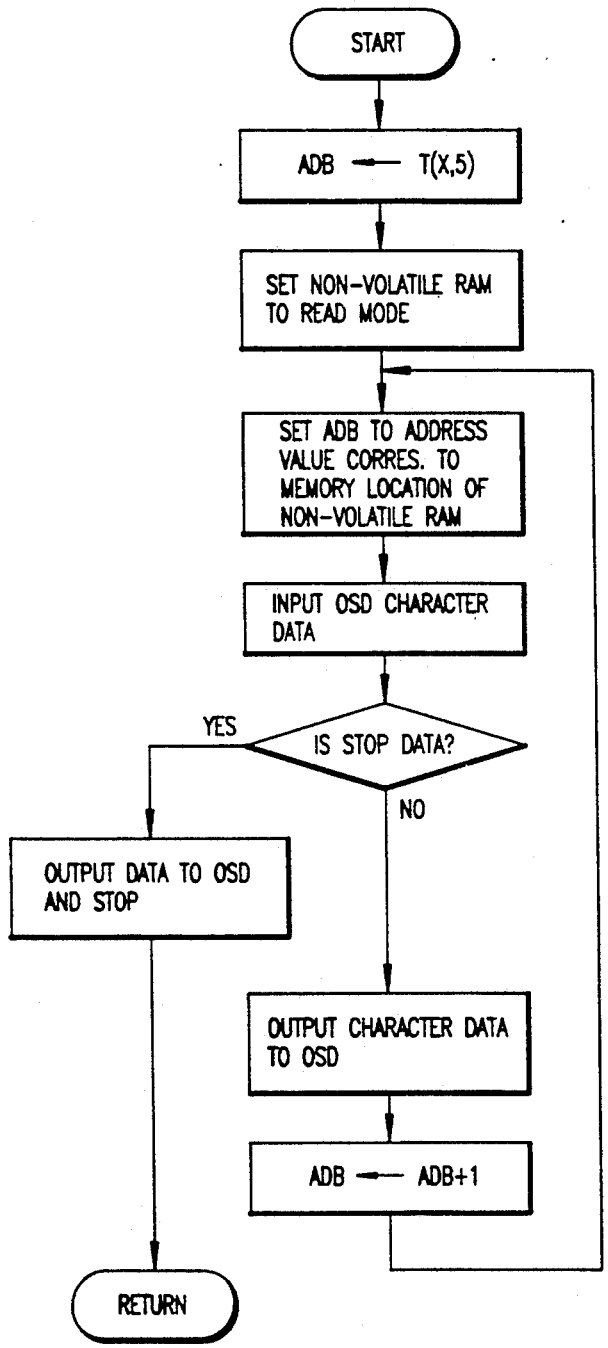
FIG. 10A is a flowchart showing the title displaying step of the automatic title inserting method according to the present invention.
FIG. 10B is a flowchart showing the title data storing step of the automatic title inserting method according to the present invention.
Figure 10:
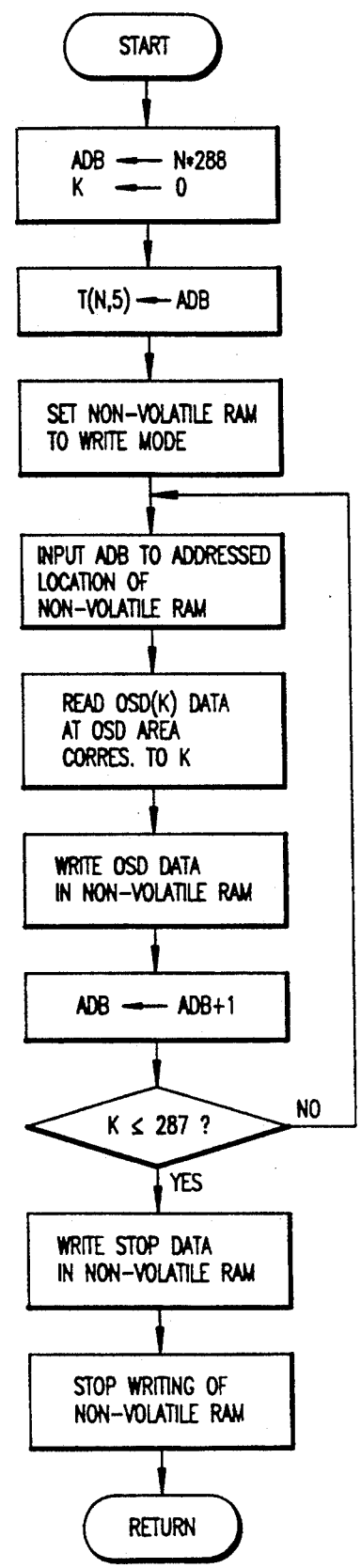

The method for automatically inserting titles in recorded video Program for VCR according to the present invention will now be described in conjunction with FIGS. 8 to 10.

Figure 8:
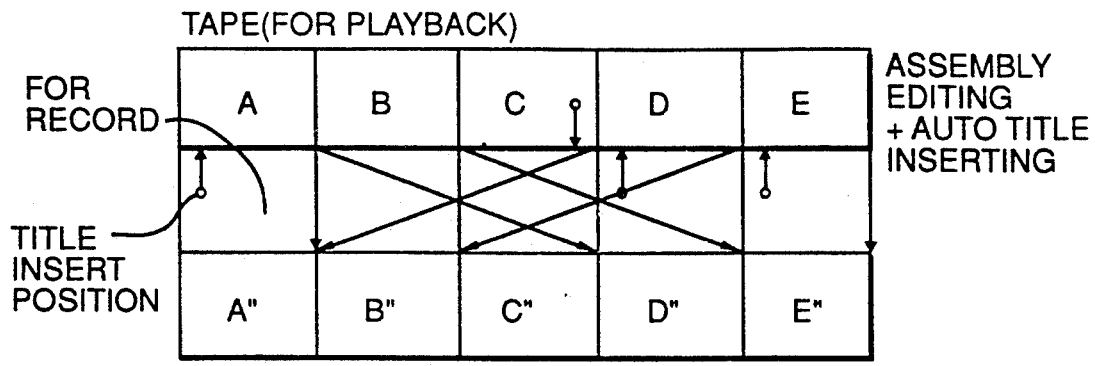
FIG. 8 is a view explaining a method for automatically inserting titles in a VCR, in accordance with the present invention.

FIG. 8 schematically shows the process of automatic and simultaneous assembly edition and title insertion of recorded programs. During the playback of programs which was recorded according to the order of A, B, C, D and E, start and end points of each recorded program are detected by using the counted values from the timer microprocessor 1 and, at the same time, start and end points for inserting a title in each recorded Program are detected programs. When the recorded programs are edited and recorded again according to the desired order of, for example, A", B", C", D" and E", titles obtained from the title editing routine of on-screen display (OSD) routine are simultaneously and automatically inserted in the predetermined positions, respectively.

Accordingly, it is possible to accomplish both the assembly edition and the title insertion by one playback and recording.

The present invention will be described in conjunction with flowcharts shown in FIGS. 9 and 10.

Prior to the description, reference characters indicated in the flowcharts are briefly explained as follows: S.P. FLAG designates a start point flag, T.i a title index buffer, A.M. an assembly menu numeral buffer, P(,) an array RAM of RAM 9 having assembly data, T(,) an array RAM having title data, X, K and N RAM buffers, A.S. FLAG an assembly start flag, A.E. FLAG an assembly enable flag, A.F. FLAG a first set flag of assembly start counter, A.R. FLAG an assembly playback preparation flag, CT a title display time counter, "R,i." an assembly preparation index buffer, and CN a counter which constitutes a part of the VCR mechanism 4 of FIG. 3 and counts capstan frequency signals or reel pulses generated from the VCR mechanism 4. Also, menu FLAG designates flag indicative of the setting of on-screen display routine, and Title 1, Title 2 and Title 3 designate the reversed conditions into the first, the second and the third title screens illustrated in FIG. 7, respectively.

FIG. 9A shows the first procedure for setting the assembly program, in accordance with the operating conditions of the assembly set switch SW1, the automatic title insert switch SW2 and the assembly enter switch SW3, which operations are carried out in accordance with a well-known diode matrix arrangement as shown in FIG. 5. FIG. 9B shows the second procedure for executing assembly programs in accordance with the operation condition of start switch SW1. FIG. 9C shows the third procedure for editing titles in the on-screen display routine, depending on the setting of assembly flag A.FLAG and assembly enable flag A.E FLAG. FIG. 9D shows the fourth procedure for counting capstan frequency signals or reel pulses by the timer microprocessor 1 shown in FIG. 3.

In executing the second procedure shown in FIG. 9B, a title display procedure proceeds as follows. That is, the content of RAM T(X, 5) having the format of FIG. 4 is stored in the predetermined register ADB, as shown in FIG. 10A. Then, the non-volatile RAM 9 is set to operate in read mode, and the value of register ADB is set to the address value corresponding to memory location of the non-volatile RAM 9. After the input of on-screen display character data, the timer microprocessor 1 detects whether the data is a stop data. If the data is stop data, character data is a outputted to the on-screen display control unit 6 shown in FIG. 3. Thus, the procedure is completed. If not, the present on-screen display character data is outputted to the on-screen display control unit 6, and then the value of register ADB is increased by "1". Thereafter, the procedure returns to the step of setting the value of register ADB to the address value corresponding to memory location of the non-volatile RAM 9.

In executing the third procedure shown in FIG. 9C, a procedure for storing title data in the non-volatile RAM 9 proceeds as follows. As shown in FIG. 10B, the product of the stored value in RAM buffer N and 288 is stored in a predetermined register ADB. After clearing RAM buffer K, the content of the register ADB is stored in the RAM portion T(X,5). Subsequently, the non-volatile RAM 9 is set to operate in write mode, and the value of register ADB is inputted to the addressed memory location of the non-volatile RAM 9. Then, the on-screen display data is read at the on-screen display area corresponding to the content of RAM buffer K and written in the non-volatile RAM 9. After increasing the values of register ADB and RAM buffer K by "1", the timer microprocessor 1 detects whether the content of RAM buffer K is 287. If not 287, the procedure returns to the step of inputting the value of register ADB to the addressed memory location of the non-volatile RAM 9. If the content of RAM buffer K is 287, stop data is inputted to the non-volatile RAM 9. Then, the writing of non-volatile RAM 9 is completed and the procedure returns to a previous procedure.

Overall procedures will now be described, in conjunction with FIGS. 9A and 9B.

First, the setting of an assembly program is executed by the operations of assembly set switch SW1, automatic title insert switch SW2 and assembly enter switch SW3 according to the diode matrix arrangement shown in FIG. 5.

Upon receiving a predetermined signal, accordingly, the timer microprocessor 1 detects whether assembly flag A.FLAG has been initially set. If assembly flag A.FLAG has not been initially set, the timer microprocessor 1 detects whether the assembly set switch SW1 is in its ON state. If the assembly set switch SW1 is in its ON state, the timer microprocessor 1 clears flags and buffers relating to the assembly program and then sets assembly flag A.FLAG so as to execute the assembly executing routine.

However, if assembly flag A.FLAG has been initially set and the assembly set switch SW1 is in its ON state, the timer microprocessor 1 changes the value X of the RAM portion T(X, LIE) having the arrangement shown in FIG. 4 over the range of 0 to 7 and detects the conditions of respective flags during the change. If any one of flags is 1, assembly enable flag A.E.FLAG is set. On the other hands, if there is no flag set of 1, the timer microprocessor 1 clears assembly enable flag A.E FLAG and then assembly flag A.FLAG. Thereafter, The procedure returns to the assembly executing routine.

If the assembly enter switch SW3 shown in FIG. 5 is in its On state and start point flag S.P FLAG is 0, under the condition that assembly flag A.FLAG is set and SW1 is not in the ON state, the timer microprocessor 1 sets the start point flag S.P FLAG and stores the present counted value from the counter CN in the counter P(A.M, START) which counts the start of the program corresponding to assembly menu number A.M. If start point flag S.P FLAG has been set, the timer microprocessor 1 clears the start point flag S.P FLAG and then sets the counter P(A.M, STOP,) adapted to stop the program designated by the buffer(A.M), to the present counted value from the counter CN. At this time, boundary detection is executed, because of 8 assembly programs.

On the other hand, if SW3 is not ON and the automatic title insert switch SW2 is also in its ON state and the start point flag S.P FLAG has been set, the timer microprocessor 1 stores the present counted value from the counter CN in the RAM portion T(T.i, 1) and inputs "1" to the RAM portion T(T.i, 2) so as to inform that an assembly automatic title has been set. Then, the timer microprocessor 1 increases the value of title index buffer T.i, where T.i means the title message number of the portion set to title index.

Thereafter, the set title index value is displayed by the display unit 50 and then the procedure proceeds to the title editing procedure of on-screen display routine of FIG. 9C.

The procedure executing assembly programs is executed by the assembly start switch SW4. If the switch SW4 is in its ON state, the timer microprocessor 1 detects whether the assembly start flag A.S FLAG has been set.

If the assembly start flag A.S FLAG has been set, the timer microprocessor 1 operates in its stop mode and clears flags relating to the assembly execution. Then, the process returns to the title editing procedure. On the other hand, if the assembly start flag A.S FLAG has not been set, the timer microprocessor 1 detects whether the assembly enter flag A.E FLAG has been set. If the assembly enter flag A.E FLAG has been set, the timer microprocessor 1 stores "0" in the assembly preparation index buffer R.i and detects whether the value of RAM portion P(R.i, LIE) is 1, while increasing in steps; the value of the assembly preparation index buffer R.i to 7.

When the value of RAM portion P(R.i, LIE) is 1, the timer microprocessor 1 sets the assembly start flag A.S FLAG and then the assembly start counter flag A.F FLAG, so as to execute the next procedure. On the other hand, if the value of RAM portion P(R.i, LIE) is 0, all flags relating to the assembly execution are cleared.

If the assembly start flag A.S FLAG has been set, the timer microprocessor 1 detects whether the assembly start counter flag A.F FLAG has been set. If not set, the process returns to the procedure for detecting whether the assembly playback preparation flag A.R FLAG has been set. If the assembly start counter flag A.F FLAG has been set, the timer microprocessor 1 compares the counted value from the counter P(R.i, START) adapted to start the program corresponding to the index R,i to start the present assembly the the present counted value from the capstan frequency and reel pulse counter CN.

That is, when P(R.i, START)>CN, Fast Forward operation FF is carried out until the counted value reaches the start counted value. Then, the assembly playback preparation flag A.R FLAG is cleared and the timer microprocessor 1 returns to its title edition mode. When P(R.i, START)<CN, the tape is rewound until the counted value reaches the start counted value. Then, the timer microprocessor 1 clears the assembly playback preparation flag A.R FLAG and returns to its title edition mode. On the other hand, if P(R.i, START)=CN, the tape is played back. Then, the timer microprocessor 1 sets the assembly playback preparation flag A.R FLAG and clears the assembly start counter flag A.F FLAG. Thereafter, the timer microprocessor 1 returns to its title edition mode.

When the assembly start counter flag A.F FLAG has been set, the timer microprocessor 1 also compares the counted value from the counter P(R.i, STOP) to the present counted value from the counter CN. If P(R.i, STOP)≦CN, the timer microprocessor 1 clears the assembly playback preparation flag A.R FLAG and reverses its operation mode to stop mode. Then, the presently executed assembly program is deleted so as to make P(R.i, LIE) be "0". Thereafter, the timer microprocessor 1 increases R.i and detects whether next program should be executed.

However, if P(R.i, STOP)>CN, the timer microprocessor 1 makes X be "0" and compares the counted value from title index buffer T(X, 1) to the present counted value from the counter CN. If both values are the same, the timer microprocessor 1 detects whether title insert position has been set during the title assembly (T(X, 2)=1?) and whether title has been set by the on-screen display routine (T(X, 3).=1?). If both are set, the title display routine shown in FIG. 10A is executed and the display time T(X, 4) is stored in the display counter CT.

When T(X, 1) is not the same as CN, the timer microprocessor 1 detects continuously the value of X while increasing it up to 40. Unless corresponding to the above-mentioned condition, the counted value from display counter CT is decreased. When the counted value from display counter CT is "0", the display is OFF.

In executing the title display procedure in the on-screen display routine, the timer microprocessor 1 detects whether the assembly enable flag A.E FLAG has been set. If set, the timer microprocessor 1 detects the menu flag state informing of the execution of on-screen display routine. If the menu flag state is detected, the on-screen display routine is initialized so as to display a normal screen. Then, the reel pulse and capstan frequency counting routine is executed.

However, when the assembly flag A.FLAG and the assembly enable flag A.E FLAG have been cleared, the menu key is operative to select or exit the main menu as shown in FIG. 7A. Upon inputting the signal from remote controller numeral key 6 shown in FIG. 6, in the main menu state, the first title screen shown in FIG. 7B can be displayed. Upon inputting the signal from the title index key and then the signal from the numeral key of two figures in the first title mode, the timer microprocessor 1 stores them in the RAM buffer N. Then the second title screen is displayed.

On the third title screen shown in FIG. 7D, the menu of the second title screen as shown in FIG. 7C is displayed and the title display time is inputted. At this time, the title display time is multiplied by 60 seconds and the resultant value is stored in the RAM portion T(X, 4), as display counted value. Thereafter, the third title screen is displayed.

The operation relating to the third title screen shown in FIG. 7D is carried out in the same manner as that in the normal title setting mode. Upon inputting the signal from the enter key shown in FIG. 6, however, the title displayed on the present screen is stored in the nonvolatile RAM 9 shown in FIG. 3, according to the program shown in FIG. 10B. At this time, leading data of the stored data is stored in the RAM portion T(X, 5).

During the execution of the counting routine, the leading edge of inputted capstan frequency or reel pulse is detected so that the counted value from the counter CN is decreased in the rewind mode REW and the review mode REVIEW and increased by "1" in other modes. Then, the procedure returns to the key input routine.

As apparent from the above description, the present invention enables easy selection of portions of respective recorded programs in which titles are inserted, respectively during the execution of assembly programs and automatic insertion of respective titles in predetermined positions, which titles are produced in the on-screen display routine. Consequently, the title inserting is very easily accomplished and at one time, thereby avoiding any poor screen quality.

What is claimed is:

1. A method for automatically inserting titles in a plurality of video programs recorded on a video tape for a video cassette recorder (VCR), said VCR including a timer microprocessor, a system control unit connected to said timer microprocessor, a VCR mechanism connected to said system control unit and the timer microprocessor, said VCR mechanism generating one of capstan frequency signals and reel pulses, a VCR servo system connected to said system control unit for controlling said VCR mechanism, a memory connected to the timer microprocessor, and a key input unit for applying the key signals to said timer microprocessor, said timer microprocessor continuously receiving and counting one of said capstan frequency signals and said reel pulses as counted values to reference desired points in the recorded video programs, said system control unit communicating with said timer microprocessor by transmitting signals and producing control signals to control the VCR servo system and the VCR mechanism, the method comprising the steps of:

playing the video tape to play back the plurality of video programs recorded on the video tape according to an original recording order;

assigning start and end points of the respective recorded video programs according to the counted values from the timer microprocessor and to the key signals applied to the timer microprocessor from the key input unit during the playback;

designating positions in said recorded video programs where respective titles are to be inserted and storing the designated positions in the memory;

entering the respective titles through a title entering means utilizing an on-screen display according to the applied key signals and storing the entered titles in the memory; and replaying the video tape to re-record the recorded video programs in a new desired order utilizing said stored start and end points of each said recorded video programs under control of a predetermined assembly program, and simultaneously and automatically reading the entered titles from the memory and inserting the entered titles respectively in said designated positions of said respective recorded video programs.

2. An apparatus for automatically inserting program titles in a plurality of video programs recorded on a video tape for a video cassette recorder (VCR), comprising:

a timer microprocessor;

a system control unit connected to said timer microprocessor, said system control unit transmitting signals to and from said timer microprocessor to produce a first control signal;

a key input unit for applying key signals to said timer microprocessor;

a VCR mechanism connected to said timer microprocessor and said system control unit for receiving said first control signal, said VCR mechanism generating and transmitting one of capstan frequency signals and reel pulses to said timer microprocessor, said timer microprocessor counting said one of capstan frequency signals and reel pulses as counted values to generate a second control signal in accordance with a key signal applied to the timer microprocessor to direct execution of an assembly program and insertion of titles in respective recorded video programs;

a VCR servo system connected to said system control unit and said VCR mechanism for receiving said first control signal from said system control unit and controlling speed and phase of said VCR mechanism;

an on-screen display control circuit connected to the timer microprocessor for displaying characters on a designated screen played back by the VCR mechanism from the recorded video programs according to said second control signal from the timer microprocessor;

a display unit connected to the microprocessor for displaying operations of said VCR and time in accordance with the first control signal from the timer microprocessor;

means for storing, under control of said microprocessor, data corresponding to the key signal applied from the key input unit to the timer microprocessor for executing assembly programs and data corresponding to the titles of said respective recorded video programs, the timer microprocessor and the system control unit operating to apply the first control signal to the VCR mechanism during a re-recording playback of the video tape to arrange, in a re-recording, an order of the originally recorded video programs to a new desired order according to said key input data stored in said storing means and outputting a third control signal to insert, from said storing means and in the re-recording, the data corresponding to said respective titles in designated positions of video screens of said respective recorded video programs.

3. The apparatus according to claim 2, wherein said storing means includes means for storing counted values from said timer microprocessor corresponding to respective start and end points of said plurality of recorded video programs.

4. The apparatus according to claim 2, wherein said storing means includes means for storing flags indicative of settings of respective assembly programs for said recorded video programs, means for storing data for executing said assembly program, and means for storing assembly numbers of respective recorded video programs.

5. The apparatus according to claim 2, wherein said storing means includes means for storing counted values from the timer microprocessor corresponding to respective positions where said respective titles of said recorded video programs are to be inserted.

6. The apparatus according to claim 2, wherein said storing means includes means for storing flags indicative of settings of respective title inserting positions of said recorded video programs and means for storing a flag indicative of settings of respective titles of said recorded video programs.

7. The apparatus according to claim 2, wherein said storing means includes means for storing respective title display times of said recorded video programs.

8. The apparatus according to claim 2, wherein said storing means includes means for storing said respective title data of said recorded video programs and means for storing leading data of said respective stored title data.

* * * * *